United States Patent
Lin et al.

(10) Patent No.: US 9,170,352 B2
(45) Date of Patent: Oct. 27, 2015

(54) COMPOUND OPTICAL FILM

(75) Inventors: Da-Wei Lin, New Taipei (TW); Tai-Cherng Yu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 518 days.

(21) Appl. No.: 13/556,224

(22) Filed: Jul. 24, 2012

(65) Prior Publication Data
US 2013/0033754 A1     Feb. 7, 2013

(30) Foreign Application Priority Data
Aug. 3, 2011    (TW) ................................. 100127499

(51) Int. Cl.
*G02B 5/02*     (2006.01)
*B29D 11/00*     (2006.01)
*F21V 8/00*     (2006.01)

(52) U.S. Cl.
CPC .......... *G02B 5/0242* (2013.01); *B29D 11/0073* (2013.01); *B29D 11/00788* (2013.01); *G02B 5/0268* (2013.01); *G02B 5/0278* (2013.01); *G02B 6/0043* (2013.01); *G02B 6/0055* (2013.01); *G02B 6/0065* (2013.01)

(58) Field of Classification Search
None
See application file for complete search history.

(56) References Cited

U.S. PATENT DOCUMENTS

| | | | |
|---|---|---|---|
| 2006/0056166 A1* | 3/2006 | Yeo et al. | 362/19 |
| 2009/0067194 A1* | 3/2009 | Sanchez | 362/618 |
| 2011/0199352 A1* | 8/2011 | Wheatley et al. | 345/207 |
| 2014/0049983 A1* | 2/2014 | Nichol et al. | 362/610 |

FOREIGN PATENT DOCUMENTS

TW     201107675 A     3/2011

* cited by examiner

*Primary Examiner* — Arnel C Lavarias
(74) *Attorney, Agent, or Firm* — Novak Druce Connolly Bove + Quigg LLP

(57) ABSTRACT

A compound optical film includes an unitary two-layer structure with of a light guide layer and a light reflective layer attached on the light guide layer. A number of light scattering particles are dispersed in the light guide layer adjacent to an interface between the light guide layer and the light reflective layer. The compound optical film can reduce the thickness of backlight module while the compound optical film is used in backlight module.

3 Claims, 2 Drawing Sheets

COMPOUND OPTICAL FILM

BACKGROUND

1. Technical Field

The present disclosure relates to a compound optical film and a method for manufacturing the same.

2. Description of Related Art

Optical films used in a backlight module include a light guide plate, a reflective plate, and a light diffusion plate. As the backlight module becomes thinner, the thickness of the optical films used in the backlight module must be designed smaller to satisfy the demand of the thinner backlight module. Usually, these optical films are separately produced and then assembled into the backlight module layer by layer. However, these manufacturing and assembly methods of the optical films not only need complex steps and may induce more defective produces, but also do not help to reduce the thickness of the backlight module.

Therefore, a compound optical film and a method for manufacturing the same, which can overcome the above-mentioned problems, is needed.

DETAILED DESCRIPTION

Figure 1:
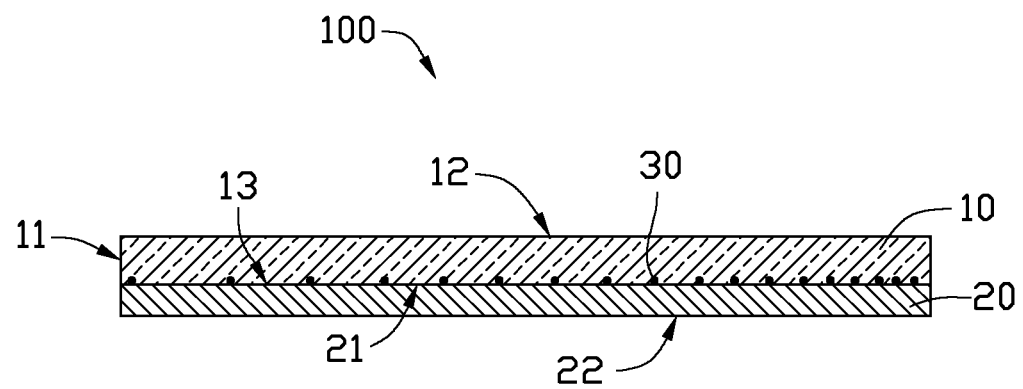
FIG. 1 is a schematic view of a compound optical film according to a first embodiment.

Referring to FIG. 1, a compound optical film 100, according to the first embodiment, is used in a backlight module. The compound optical film 100 includes a light guide layer 10, a light reflective layer 20, and light scattering particles 30.

The light guide layer 10 includes a light incident surface 11, a light emitting surface 12, and a first contact surface 13. The light emitting surface 12 adjoins to the light incident surface 11. The first contact surface 13 faces the light emitting surface 12 and adjoins the light incident surface 11.

The light guide layer 10 is made of a light-permeable material, which is usually used to make light guide plates, such as PMMA (Polymethyl Methacrylate), COP (Cocio Olefines Polymers), and PC (Polycarbonate). In the embodiment, the light guide layer 10 is comprised of PMMA.

The light reflective layer 20 includes a second contact surface 21 and a bottom surface 22 opposite to the second contact surface 21. The second contact surface 21 is corresponding with the first contact surface 13 of the light guide layer 10. The light reflective layer 20 and the light guide layer 10 are laminated together to form a whole body in a manner that the first contact surface 13 and the second contact surface 21 are adhered to each other. The light reflective layer 20 is made of high-reflectance materials. In present embodiment, the light reflective layer 20 is comprised of PET(polyethylene terephthalate). Light is transmitted into the light guide layer 10 from the light incident surface 11, then is reflected by the light reflective layer 20, and finally exits out of the light guide layer 10 from the light emitting surface 12.

In another embodiment, the light striking on the light reflective layer 20 may partly enter into the light reflective layer 20 from the second contact surface 21 and emit out of the light reflective layer 20 from the bottom surface 22. A reflective coating (not shown) can be formed on the bottom surface 22 of the light reflective layer 20 to avoid the light emitting out of the light reflective layer 20 from the bottom surface 22.

The light scattering particles 30 are dispersed in the light guide layer 10 and arranged on the second contact surface 21. The light scattering particles 30 are used to scatter light striking on the second contact surface 21 to make the brightness of the light emitting from the light emitting surface 12 become more uniform.

A distribution density of the light scattering particles 30 on the second contact surface 21 may be uniform or non-uniform according to different design requirements. In the present embodiment, a distribution density of the light scattering particles 30 gradually increases along a direction away from the light incident surface 11. In this situation, the brightness of the light emitting from the light emitting surface 12 can be more uniform.

When the compound optical film 100 is used in the backlight module, the light guide layer 10 can be instead of the prior light guide plate, the light reflective layer 20 can be instead of the prior light reflective plate. Additionally, the light scattering particles 30 dispersed in the light guide layer 10 can also play the role of a prior light diffusion plate. With above-mentioned compound structure, the compound optical film 100 has triple functions of guiding light, reflecting light, and diffusing light. Comparing with the prior light guide plate and light reflective plate separately assembled in backlight module, the unitary structure of the compound optical film 100 can avoid a gap forming between the light guide layer and the light reflective layer and is helpful to reduce the thickness of the backlight module.

Figure 2:
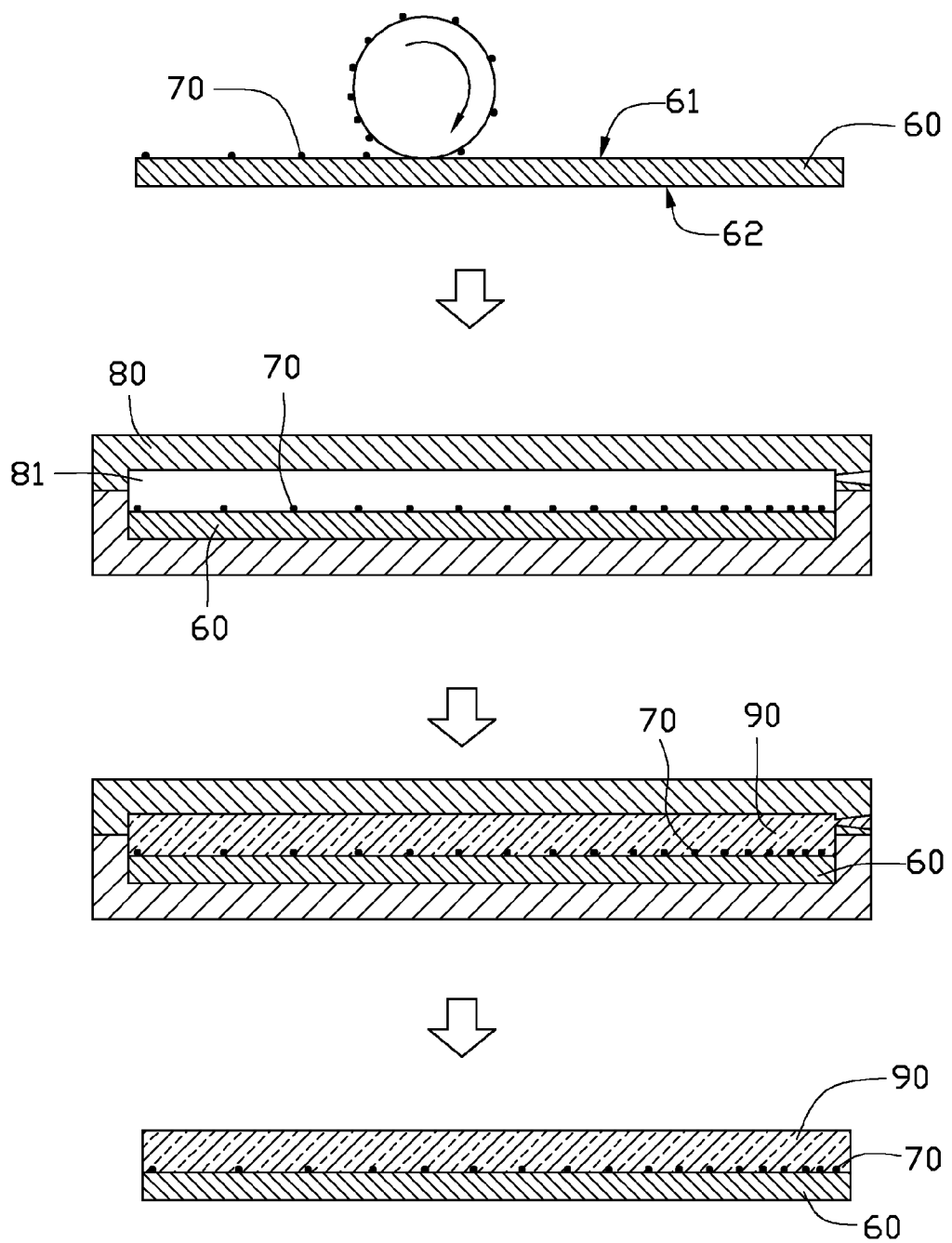
FIG. 2 is a schematic view of a manufacturing method of the compound optical film of FIG. 1 according to a second embodiment.

Referring to FIG. 2, a method for manufacturing the compound optical film 100, according to a second embodiment, includes following steps.

Firstly, a light reflective film 60 is provided. The light reflective 60 includes a second contact surface 61 and a bottom surface 62 opposite to the second contact surface 61. In an alternative embodiment, a reflective coating can be formed on the bottom surface 62.

Secondly, a plurality of light scattering particles 70 are formed on the second contact surface 61. In the present embodiment, the light scattering particles 70 are formed on the second contact surface 61 by roller-printing method described as follows. Ink containing particles with high reflectivity, such as TiO2, BaSO4 etc, is provided. The ink is printed on the second contact surface 61, and finally the ink is dried to form the light scattering particles 70 on the second contact surface 61. The distribution density of the light scattering particles 70 on the second contact surface 61 may be uniform or non-uniform according to different design. In the present embodiment, the distribution density of the light scattering particles 70 in the second contact surface 61 is gradually bigger or smaller from one side to an opposite side of the second contact surface 61.

Thirdly, a mold 80 including a molding cavity 81 is provided. The light reflective film 60 with light scattering particles 70 on the second contact surface 61 is placed into the molding cavity 81. The bottom surface 62 is attached on the inner wall of the molding cavity 81 and the second contact surface 61 and the light scattering particles 70 are exposed in the molding cavity 81.

Finally, light-permeable material is introduced into the molding cavity 81 to cover the second contact surface 61 and the light scattering particles 70, thereby a light guide layer 90 is formed on the second contact surface 61.

By the above-motioned manufacturing method, the compound optical film 100 having triple functions of guiding light, reflecting light, and diffusing light can be obtained. When the compound optical film 100 is used in the backlight module, one piece of the compound optical film 100 can be instead of three pieces optical film including the light guide plate, light reflective plate and light diffusing plate previously used in the backlight module. This can greatly simplify the assemble steps of the backlight module and help to reduce the thickness of the backlight module.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A compound optical film comprising
    an unitary two-layer structure consisting of a light guide layer and a light reflective layer attached on the light guide layer; the light guide layer comprises a light incident surface, a first contact surface adjoining the light incident surface, and a light emitting surface adjoining the light incident surface and facing away from the first contact surface; the light reflective layer comprises a second contact surface in contact with the first contact surface and a bottom surface facing away from the second contact surface; and
    a plurality of light scattering particles formed on the light reflective layer, and all of the light scattering particles contacting the second contact surface.

2. The compound optical film of claim 1, wherein a distribution density of the light scattering particles gradually increases along a direction away from the light incident surface.

3. The compound optical film of claim 1, wherein a material of the light guide layer is selected from the group consisting of Polymethyl Methacrylate (PMMA), Cocio Olefines Polymers (COP), and Polycarbonate (PC).

* * * * *